(12) United States Patent
Worley et al.

(10) Patent No.: US 7,262,537 B2
(45) Date of Patent: Aug. 28, 2007

(54) ELECTRIC MOTOR AND GENERATOR COMPONENT HAVING A PLURALITY OF WINDINGS MADE FROM A PLURALITY OF INDIVIDUALLY CONDUCTIVE WIRES

(75) Inventors: Andrew C. Worley, Arvada, CO (US); Lawrence J. Kintz, Jr., Rockford, IL (US); Gary Dickes, Kenosha, WI (US); Mahesh Shah, Lindenhurst, IL (US); Bruce J. Wallen, Waterford, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 10/199,951

(22) Filed: Jul. 19, 2002

(65) Prior Publication Data

US 2004/0012290 A1    Jan. 22, 2004

(51) Int. Cl.
   *H02K 1/00* (2006.01)
(52) U.S. Cl. ...................... 310/179; 310/254
(58) Field of Classification Search .............. 310/213, 310/254, 179
   See application file for complete search history.

(56) References Cited

U.S. PATENT DOCUMENTS

| | | | |
|---|---|---|---|
| 587,764 A * | 8/1897 | Short ..................... 174/129 R |
| 2,978,530 A * | 4/1961 | Braeckman ................ 174/34 |
| 3,614,497 A | 10/1971 | Brenner |
| 4,128,779 A * | 12/1978 | Salon ......................... 310/213 |
| 4,260,924 A * | 4/1981 | Lugosi et al. ............... 310/213 |
| 4,611,138 A * | 9/1986 | Kindig et al. ................. 310/71 |
| 4,841,217 A * | 6/1989 | Weldon et al. .............. 310/266 |
| 4,908,347 A * | 3/1990 | Denk ........................ 310/254 |
| 6,566,778 B1 * | 5/2003 | Hasegawa et al. .......... 310/211 |
| 6,649,844 B2 * | 11/2003 | Kusumoto et al. ....... 174/128.1 |
| 2002/0050395 A1 * | 5/2002 | Kusumoto et al. ....... 174/128.2 |
| 2002/0096959 A1 * | 7/2002 | Qin et al. ................... 310/208 |
| 2003/0001441 A1 * | 1/2003 | Peterson et al. ............ 310/208 |

FOREIGN PATENT DOCUMENTS

DE            740651         10/1943

OTHER PUBLICATIONS

International Search Report Nov. 14, 2003.

* cited by examiner

*Primary Examiner*—Thanh Lam
(74) *Attorney, Agent, or Firm*—Carlson, Gaskey & Olds

(57) ABSTRACT

An electric motor or generator assembly includes a component, such as a stator, having a plurality of windings. A wire set including a plurality of individually conductive wires twisted together is manipulated within a core to establish the desired number of windings having the desired cross sectional area. In one example, a plurality of such wire sets are manipulated simultaneously to establish the windings. Litz wire is one example type of wire set that is useful in an assembly designed according to this invention. There are more than 100 individual wires within each winding according to one example stator designed according to this invention.

14 Claims, 1 Drawing Sheet

ELECTRIC MOTOR AND GENERATOR COMPONENT HAVING A PLURALITY OF WINDINGS MADE FROM A PLURALITY OF INDIVIDUALLY CONDUCTIVE WIRES

BACKGROUND OF THE INVENTION

1. Field of the Invention

This invention generally relates to electric motors and generators. More particularly, this invention relates to electric motor and generator components having electrically conductive windings with large cross sections.

2. Description of the Prior Art

Electric motors and generators are well known and in widespread use. There are a variety of applications for electric motors and generators. Depending on the application, different motor and generator characteristics are required.

In conventional electric motors and generators, stator windings are constructed by winding coils of conductors. For many applications the coils are constructed using one to three single strand conductors in parallel in order to provide the desired characteristics. For higher speed or low voltage applications, however, the electromagnetic design often requires a coil that has a lower number of turns and a proportionally increased cross sectional area of each turn. The increased cross section is typically achieved by using larger cross section conductors or a plurality of conductors in parallel.

Motors and generators having a large cross sectional area per turn of the winding are difficult or impractical to manufacture using conventional approaches. Large cross-section conductors, for example, are difficult to manipulate and form. A disadvantage of using a plurality of conductors in parallel is that it can be difficult to maintain the several parallel conductors together during the manufacturing or winding process.

Additionally, whichever of the approaches is chosen, there is a requirement for making an electrical connection between the winding wires and an external power source. In conventional arrangements, a separate lead wire is connected to the stator winding to make such a connection. This introduces an additional manufacturing step and introduces the possibility for a less than perfect connection to be made.

This invention addresses the need for being able to easily manufacture and design an electric motor or generator component requiring windings with large cross sectional areas.

SUMMARY OF THE INVENTION

In general terms, this invention is an electric motor or generator assembly having a component with a plurality of windings that each comprise a relatively large number of individual conductors twisted together. The individual conductors provide a cross section as large as required but allows for easy handling and manipulation of the wire set, which makes the manufacturing process simpler and more economical.

An example assembly designed according to this invention includes a first portion and a second portion that is supported for a rotational movement relative to the first portion. The first portion or the second portion has the plurality of windings made up of at least one wire set that includes a plurality of individual conductors twisted together.

In one example, Litz wire is used as the wire set. The individual conductors are twisted together so that they stay together during the handling and manipulation of the wire while forming the windings. In one example, a plurality of such wire sets are used to achieve the desired cross section of the conductive windings.

A method of making an electric motor or generator component according to this invention includes several steps. First a core having a plurality of longitudinally extending channels is provided. At least one wire set that has more than one individual conductive wires twisted together is pulled through one of the channels. The wire set is then manipulated outside the channel and pulled through another one of the channels. This process is repeated until all of the channels have the desired amount of wire within them to achieve the desired cross section of the windings.

The inventive arrangement and approach provides an improved motor or generator assembly and increased manufacturing economies because the ability to handle the wires required to make the windings of desired cross section is simplified compared to prior attempts. This winding configuration can be either hand or machine wound due to the reduced number of wire sets. In one example, an in-slot winding technique is used, although other winding techniques may also be used.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
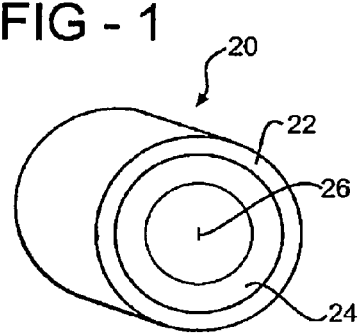
FIG. 1 schematically illustrates an electric motor or generator assembly designed according to this invention.

FIG. 1 schematically illustrates an assembly 20 that may be an electric motor, generator or both. The assembly 20 includes a first portion 22 and a second portion 24. One of the portions 22 or 24 is supported to be rotational relative to the other about an axis 26 of the motor assembly. The manner of powering an electric motor or obtaining power from a generator is known.

Figure 3:
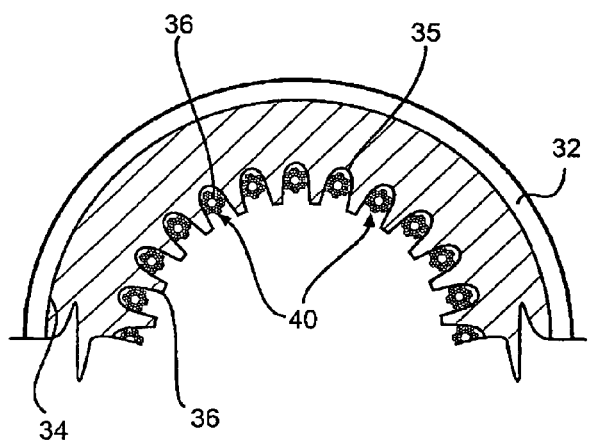
FIG. 3 is a cross-sectional view taken along the lines 3-3 in FIG. 2.
Figure 2:
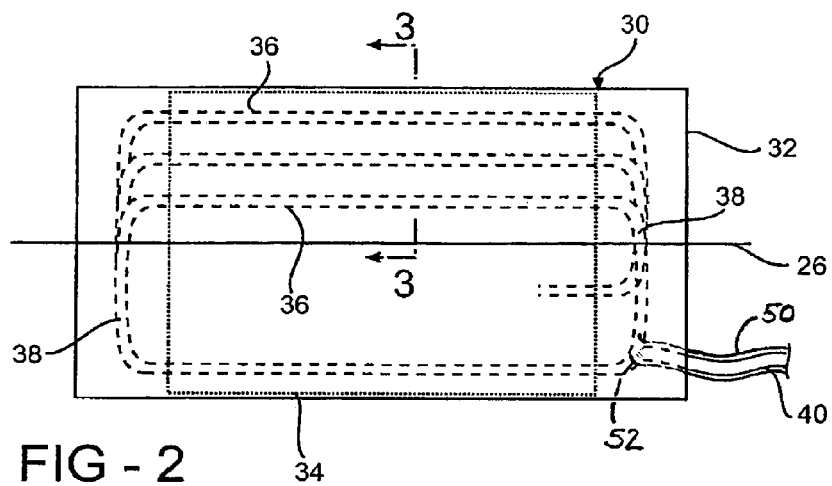
FIG. 2 schematically illustrates an example electric motor or generator component designed according to this invention.

FIG. 2 schematically illustrates a stator motor and generator component 30 designed according to this invention. A stator core 34 includes a plurality of longitudinally extending slots 35 (best seen in FIG. 3). The stator core 34 can be formed in a conventionally known manner using a plurality of sheets or laminations of metal material. The channels or grooves 35 support a plurality of electrically conductive windings 36 that have a plurality of individual conductors that collectively establish a cross sectional dimension sufficient to meet the needs of a particular situation. The windings 36 extend through the channels 35 and loop around ends of the core 34 as shown at 38. The slots 35 may be the open (as shown in FIG. 3) or closed type.

The inventive arrangement includes a wire set having a plurality of individually conductive wires twisted or braided together so that the overall cross section of the wire set is consistent with a heavy gauge wire but the flexibility of the wire set is consistent with a lighter gauge wire so that manipulating and twisting the wire set while forming the windings 36 can be readily accomplished. In one example, each winding includes more than one hundred individual wires.

According to one example method of making a motor and generator component designed according to this invention, a wire set 40 having a plurality of individual conductors twisted together is pulled through the channels 35 in a selected order from one end of the core 34 to the other and then fed back through another channel in an opposite direction until all of the channels are sufficiently filled to establish the desired winding configuration. The portions of the wire set 40 at the opposite ends of the core 34 are bundled together at 38. The windings may be established manually or using automated machinery.

In one example, a plurality of wire sets 40 are used for each winding 36. The plurality of wire sets may be simultaneously manipulated and set within the core 34 to establish the windings 36. The number of such sets and the content of each set can be customized depending on the needs of a particular situation.

Figure 4:
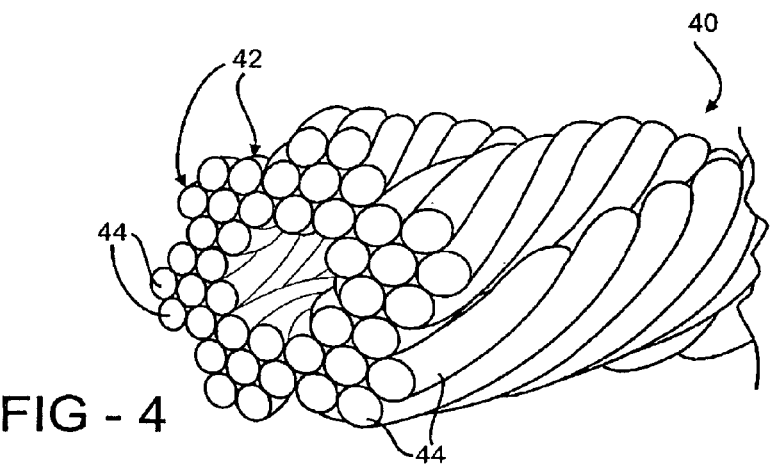
FIG. 4 schematically illustrates an example wire set used to form windings in an example component designed according to this invention.

FIG. 4 schematically illustrates a wire set 40 having a plurality of subsets 42 of individual conductors 44 twisted together. Having the conductors 44 pretwisted together makes assembling the windings 36 easier compared to conventional approaches. In this particular example, there are six subsets 42 of seven individually conductive wires 44 all twisted together into a single wire set 40 of forty two conductors 44. The number of wires chosen within a wire set and their dimensions depends upon the availability of such wires and the needs of a particular situation. By appropriately selecting the wire numbers and dimensions as a function of the stator dimensions (for example stator bore), the slot fill can be maximized while maintaining winding flexibility and simplifying the terminations.

Litz wires are particularly useful for the wire sets in a motor and generator component designed according to this invention. Round or rectangular wire set configurations may be used. Litz wires are commercially available.

Litz wire is a form of braided conductor that achieves a large cross sectional area through braiding together a large number of conductors each of which has a small cross sectional area. Litz wire is typically used in very high frequency devices such as communications equipment.

Those skilled in the art who have the benefit of this description will realize that according to this invention it is possible to select conductive wire sets, such as Litz wire, having outside dimensions, a number of individual wires and a number of turns to obtain the desired fill factor within the slots 35 while using the same type of wire set. This is yet another advantage of this invention. For example, for motor and generator components requiring windings having a cross section that corresponds to thirty-six wires of a given dimension, could include eighteen turns of two such wire sets, six turns of six such wire sets or two turns of eighteen such wire sets.

The inventive approach to designing a high speed motor and generator permits selecting the number of turns to optimize both power factor and efficiency, which typically cannot both be maximized at the same time. Using the inventive arrangement and selecting the number of turns according to the requirements of a given situation optimizes performance over a wide range of power and speed.

A further requirement for high speed motors is to minimize the bearing span to maximize rotordynamic stability. The inventive arrangement results in the wires lying closely together where they wrap around the end of the core 38 (i.e., at the end winding). This increases compactness and reduces the overall length. The inventive arrangement, therefore, minimizes the bearing span of the motor.

The compactness of the end winding 38 is also influenced by the method in which the leadwires are connected to the winding. Typically the leadwire is a separate component which is connected to the winding with a connection occurring in the end winding, which increases the bulk of the end winding. In the illustrated example, a portion of the wire set 40 that forms the windings 36 extends out of the stator assembly 30 to provide a lead for making the electrical connection without requiring a separate leadwire. The wires used as the lead preferably are drawn from different locations within the end winding to further prevent any localized 'bulking' of the end winding.

In one example the wires that extend out of the winding to form the leadwire preferably are sleeved using a sleeve which may be Teflon. The end of the sleeve closest to the winding is imbedded within the end winding to create a good seal to prevent any liquids such as oil in oil cooled motors and generators from penetrating inside the sleeve.

Litz wires and other wire sets having a plurality of individually conductive wires conventionally have only been used for high frequency applications and have not previously been used for electric motor or generator components like those provided by this invention.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An electric motor or generator assembly, comprising:
a first portion;
a second portion that is supported for rotational movement relative to the first portion, the first or second portion having a plurality of windings comprising at least one Litz wire wire set including a plurality of individual conductors twisted together with open spacing between at least some of the conductors along at least a portion of a longitudinal length of the wire set, a portion of the individual conductors extends outwardly from an end winding of at least one of the plurality of windings forming electrically conductive leads adapted to couple the windings to a source of power; and
a sleeve surrounding the portion of the individual conductors, the sleeve having an end near the at least one end winding, the end is embedded within a corresponding part of the at least one end winding such that a liquid is not permitted to penetrate inside the sleeve.

2. The assembly of claim 1, wherein the windings comprise a plurality of the wire sets.

3. The assembly of claim 1, including at least ten individual conductors in the wire set.

4. The assembly of claim 1, including at least one hundred individual conductors in the wire set.

5. The assembly of claim 1, wherein the second portion comprises a stator having a metal core with a plurality of longitudinal grooves that each support the individual conductors.

6. A stator for use in an electric motor or generator, comprising:
   a core having a plurality of longitudinally extending grooves; and
   at least one Litz wire extending through the grooves to establish a plurality of windings in the core, the at least one Litz wire having a plurality of individual conductors with open spacing between at least some of the conductors along at least a portion of a longitudinal length of the Litz wire, a portion of the individual conductors extends outwardly from and end winding of at least one of the plurality of windings forming electrically conductive leads adapted to couple the windings to a source of power; and
   a sleeve surrounding the portion of the individual conductors, the sleeve having an end near the at least one end winding, the end is embedded within a corresponding part of the at least one end winding such that a liquid is not permitted to penetrate inside the sleeve.

7. The stator of claim 6, including a plurality of Litz wires in each groove each comprising a plurality of individual conductors.

8. The stator of claim 7, wherein there is at least one hundred individual conductors.

9. An electric motor or generator assembly, comprising:
   a first portion;
   a second portion that is supported for rotational movement relative to the first portion, the first or second portion having a plurality of windings comprising at least one wire set including a plurality of individual conductors twisted together with open spacing between at least some of the conductors along at least a portion of a longitudinal length of the wire set, the individual wires carrying electrical current having an operating frequency of less than 2000 Hz, a portion of the individual conductors extends outwardly from at least an end winding of one of the plurality of windings forming electrically conductive leads adapted to couple the windings to a source of power; and
   a sleeve surrounding the portion of the individual conductors, the sleeve having an end near the at least one end winding, the end is embedded within a corresponding part of the at least one end winding such that a liquid is not permitted to penetrate inside the sleeve.

10. The assembly of claim 9, wherein the wire set comprises a Litz wire.

11. The assembly of claim 9, wherein the windings comprise a plurality of the wire sets.

12. The assembly of claim 9, including at least ten individual conductors in the wire set.

13. The assembly of claim 9, including at least one hundred individual conductors in the wire set.

14. The assembly of claim 9, wherein the second portion comprises a stator having a metal core with a plurality of longitudinal grooves that each support the individual conductors.

* * * * *